(12) United States Patent
Introwicz

(10) Patent No.: US 10,097,118 B2
(45) Date of Patent: Oct. 9, 2018

(54) CURRENT MEASURING APPARATUS FOR USE WITH ELECTRIC MOTORS

(75) Inventor: Ernest Henry Introwicz, Solihull (GB)

(73) Assignee: TRW LIMITED, Solihull, West Midlands (GB)

( * ) Notice: Subject to any disclaimer, the term of this patent is extended or adjusted under 35 U.S.C. 154(b) by 502 days.

(21) Appl. No.: 12/599,840

(22) PCT Filed: May 12, 2008

(86) PCT No.: PCT/GB2008/001640
§ 371 (c)(1),
(2), (4) Date: Jan. 25, 2010

(87) PCT Pub. No.: WO2008/139178
PCT Pub. Date: Nov. 20, 2008

(65) Prior Publication Data
US 2012/0013282 A1    Jan. 19, 2012

(30) Foreign Application Priority Data

May 12, 2007    (GB) .................................. 0709200.0

(51) Int. Cl.
*H02P 6/06*    (2006.01)
*H02P 3/00*    (2006.01)
(Continued)

(52) U.S. Cl.
CPC .......... *H02P 6/186* (2013.01); *H02P 2203/01* (2013.01); *H02P 2207/05* (2013.01)

(58) Field of Classification Search
CPC .... H02P 6/182; H02P 6/06; H02P 6/16; H02P 6/08; H02P 6/14
(Continued)

(56) References Cited

U.S. PATENT DOCUMENTS 3,961,898 A    6/1976    Neeley et al.
4,546,301 A *  10/1985   Tinebor ................ H02J 3/1892
                                                  318/729
(Continued)

FOREIGN PATENT DOCUMENTS

CN    1689220 A    10/2005
GB    2331191 A    5/1999
(Continued)

OTHER PUBLICATIONS

UK Search Report to Application No. GB0709200.0.
(Continued)

*Primary Examiner* — Bickey Dhakal
*Assistant Examiner* — Gabriel Agared
(74) *Attorney, Agent, or Firm* — MacMillan, Sobanski & Todd, LLC

(57) ABSTRACT

A current measuring circuit for an electric motor provides an output indicative of the change in the current di/dt flowing in a phase of the electric motor over a measurement period of time. The circuit includes a current measurement element having a resistance; a switch which in use selectively permits transmission of a voltage dependent upon the instantaneous value of the voltage dropped across the current measurement element to a part of the circuit; and a switch controller which is adapted to operate the switch in response to timing signals supplied by the switch controller so as to define the measurement period of time.

15 Claims, 5 Drawing Sheets

(51) Int. Cl.
*G05B 11/28* (2006.01)
*G06F 1/00* (2006.01)
*H02P 6/18* (2016.01)

(58) Field of Classification Search
USPC ............ 318/369, 400.06, 490, 599; 713/300
See application file for complete search history.

(56) References Cited

U.S. PATENT DOCUMENTS

| | | | |
|---|---|---|---|
| 4,772,839 A | | 9/1988 | MacMinn et al. |
| 5,015,939 A | | 5/1991 | Konecny |
| 5,386,152 A | | 1/1995 | Naraki |
| 5,783,940 A | * | 7/1998 | Kolomeitsev ........ G01D 5/2013 |
| | | | 310/68 B |
| 6,172,498 B1 | | 1/2001 | Schmidt et al. |
| 6,825,632 B2 | * | 11/2004 | Hahn et al. ................... 318/599 |
| 7,015,664 B2 | | 3/2006 | Coles et al. |
| 7,308,192 B2 | * | 12/2007 | Williams ............ H02M 7/5387 |
| | | | 318/606 |
| 2004/0104695 A1 | * | 6/2004 | Hahn et al. ................... 318/254 |
| 2005/0283324 A1 | | 12/2005 | Swanson |
| 2006/0001392 A1 | * | 1/2006 | Ajima ................... B62D 5/046 |
| | | | 318/432 |
| 2006/0158142 A1 | * | 7/2006 | Kurosawa et al. ........... 318/254 |
| 2007/0194730 A1 | * | 8/2007 | Fukamizu ................ H02P 6/21 |
| | | | 318/400.09 |
| 2007/0216325 A1 | * | 9/2007 | Fukamizu et al. ............ 318/254 |
| 2007/0247091 A1 | * | 10/2007 | Maiocchi .............. H02M 3/156 |
| | | | 318/400.04 |

FOREIGN PATENT DOCUMENTS

| | | |
|---|---|---|
| JP | 2002082724 A | 3/2002 |
| KR | 20050122313 A | 12/2005 |
| WO | 2004023639 A1 | 3/2004 |

OTHER PUBLICATIONS

International Search Report to International application No. PCT/GB2008/001640 completed on Sep. 12, 2008.
Chinese Search Report, Application No. CN 200880021547.2 dated Jan. 31, 2012.
Patent Act 1977: Search Report under Section 17, Application No. GB0709200.0 dated Sep. 3, 2007.

* cited by examiner

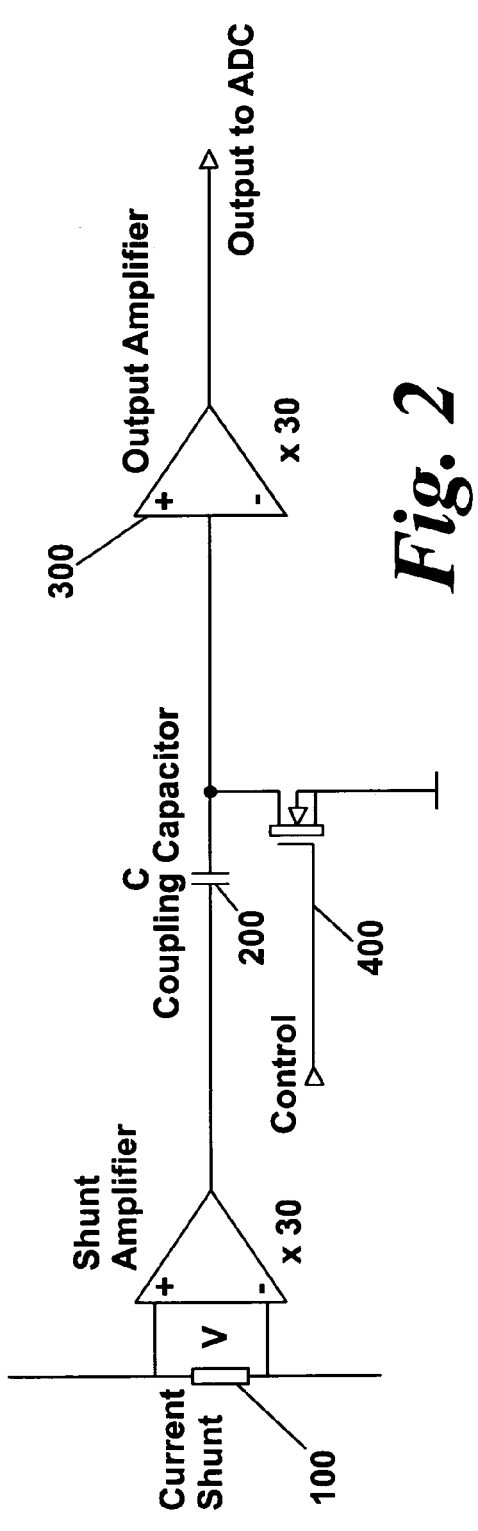
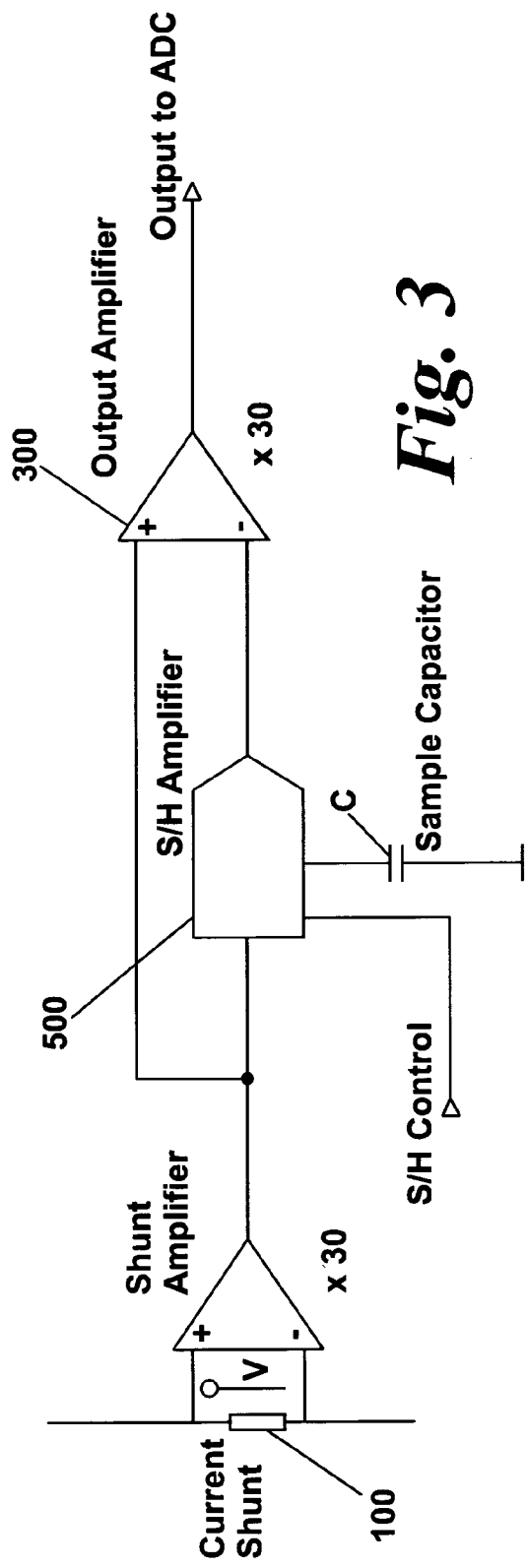

US 10,097,118 B2

CURRENT MEASURING APPARATUS FOR USE WITH ELECTRIC MOTORS

CROSS-REFERENCE TO RELATED APPLICATIONS

This application is the National Phase of International Application PCT/GB2008/001640 filed 12 May 2008 which designated the U.S. That International Application was published in English under PCT Article 21(2) on 20 Nov. 2008 as International Publication Number WO 2008/139178 A1. PCT/GB2008/001640 claims priority to U.K. Application No. 0709200.0, filed 12 May 2007. Thus, the subject nonprovisional application also claims priority to U.K. Application No. 0709200.0, filed 12 May 2007. The disclosures of both applications are incorporated herein by reference.

This invention relates to a current measuring apparatus for use with an electric motor, and to a drive apparatus for an electric motor which uses a current measuring apparatus in determining the angular position of the electric motor. It has particular application in an electric power steering system.

Electric motors have found application in a wide range of situations. One particular area in which they have found use in the last two decades is electric power steering systems. In such a system, an electric motor is used to provide an assistance torque for the driver. The motor is connected to the steering system and applies a torque that is dependent on the torque applied to the steering system by the driver. This is typically measured using a torque sensor connected to the steering column.

In order to control the motor, it is often required to know the position of the motor. This measurement can also be used in a steering system to determine the position of the steering column and hence the angle of the roadwheels and steering wheel. Provided that there is a fixed relationship between the motor angle and the steering wheel, then knowledge of the position of one allows the position of the other to be calculated. This measurement is usually performed using an angular position sensor.

It has been appreciated that it would be advantageous to be able to measure motor position without the need for a dedicated position sensor. This would allow sensorless control and potentially reduce both costs and complexity of the system.

In applicants earlier patent application published as WO2004/023639, there is disclosed a method of controlling a motor which provides for a low level of acoustic noise by careful selection of the voltage waveforms used to drive the motor phases. In that application, a technique for sensorless control which exploits measurements of the instantaneous motor phase current is proposed. Changes in reluctance with motor position are determined by measurement of the rate of change of current in a phase of the motor. This means that a dedicated position sensor is no longer needed and can instead be replaced by a measuring circuit 600 as shown in FIG. 6 of the accompanying drawings. By measuring the di/dt of the motor current ripple with sufficient resolution and accuracy in conjunction with a known motor inductance variation with position, the motor position can be determined even at low motor speeds, perhaps down to zero rpm.

A simple position measuring circuit is suggested in WO2004/023639 involving a differential amplifier 610 connected directly across a shunt resistor 620 to measure the rate of change of current di/dt in a phase and from this determine the phase inductance and then position. The amplifier will amplify the voltage dropped across the resistor and must have a high dynamic range to accommodate the large change in voltage at the start of a test pulse as well as the small changes in voltage within a test pulse. The need for the high precision amplifier high dynamic range amplifier increases costs which the applicant now realises is undesirable.

According to a first aspect the invention provides a current measuring circuit for an electric motor adapted to provide an output indicative of the change in the current flowing in a phase of the electric motor over a measurement period of time, the circuit including:

a current measurement element having a resistance;
a switch which in use selectively permits transmission of a voltage dependent upon the instantaneous value of the voltage dropped across the current measurement element to a part of the circuit; and
a switch controller which is adapted to operate the switch in response to timing signals supplied by the switch controller so as to define the measurement period of time.

The use of a switch which selectively permits transmission of a voltage dependent upon the instantaneous voltage dropped across the current measurement element (by being opened and closed or vice versa) to provide a measurement period can be used to ensure that at least a part of measuring circuit is not exposed to the voltage across the element at a time when excessively high rates of change of current occur in the phase such as the leading and trailing edges of a pulse of a pulse width modulation scheme.

The switch may be operable between a first state in which it is open and a second state in which it is closed.

The current measuring element may comprise one or more resistors connected in series with a phase of the motor such that current flowing through the motor phase flows through the resistor. The measuring circuit may measure the voltage dropped across the resistor, or more preferably the change in the voltage dropped across the resistor during the measurement period of time. From this change the rate of change can be calculated which is dependent on the motor phase inductance.

The measurement circuit may further include a capacitor which prior to the measurement period of time is electrically connected (directly or indirectly) to the resistive element (or another component which has a voltage dropped across it that depends on the voltage dropped across the resistive element) when the switch is in the first state such that the voltage across the capacitor is dependent on the voltage across the element, and which during the measurement period of time the capacitor is electrically isolated from the resistive element so as to hold across its terminals a voltage equal to the voltage across the current sensing element at the time that the switch is moved to it second state.

Thus, in the second state the switch selectively isolates that part of the circuit that includes the capacitor from the instantaneous voltage dropped across the element during the measurement period of time.

In the first state the switch may be open and in the second state it may be closed. For a perfect switch having zero conductance and infinite impedance when closed this will mean that the capacitor is completely isolated. Of course, a practical switch will have a non-zero conductance and finite impedance when closed but the scope of claim should be construed such that the presence of such a finite impedance is still considered to represent isolation of the capacitor and element.

In this arrangement the switch selectively isolates the resistive element of the circuit from the capacitor during measurement so that is then prevented from discharge. This held voltage on the capacitor can then be used by the measuring circuit to indicate the voltage at the start of the measuring period and provides a reference against which the voltage across the element during the measurement period can be compared to give a measurement of the change of voltage and hence change of current.

The capacitor and switch may therefore form part of a sample and hold circuit with the switch performing the function of the trigger for the sample and hold circuit.

More specifically, the circuit may comprise a differential amplifier having a first input connected to the current measuring element and a second input connected to the side of the capacitor that is not connected to the switch, (i.e. the output of a sample and hold circuit as described above). The first input may comprise the positive input and the second the negative input of the amplifier.

The amplifier will therefore give an output at any instant during the measurement period of time indicative of the change in current in the phase. At other times, both inputs may receive the same voltage and hence the amplifier may produce a zero output voltage. By using a high input impedance amplifier and a short measuring period there will be little or no discernible drop in the charge on the capacitor, and hence its held voltage.

In an alternative arrangement, the measurement circuit may include a capacitor which, prior to the measurement period of time, is electrically connected (directly or indirectly) to the resistive element (or another component which has a voltage dropped across it that depends on the voltage dropped across the resistive element) both immediately prior to the measuring period and during the measuring period and in which the switch is adapted to connect the other side of the capacitor to ground immediately prior to the measuring period of time and to isolate the other side of the capacitor from ground during the measurement period of time.

Thus the switch selectively isolates that part of the circuit which contains the input to the amplifier from the voltage dropped across the resistor during the measurement period of time.

In this alternative arrangement the effect of the capacitor and switch is to selectively clamp the output side of capacitor to the ground level prior to the measurement period such that during the measurement period the voltage at the output of the capacitor only reflects the changes in the voltage across the measurement element that occur during the measurement period. Any DC component to the voltage is therefore effectively removed.

The switched side of the capacitor may be electrically connected to the input of an amplifier so that the circuit functions as a keyed clamp or DC restoration amplifier circuit with respect to the DC component of the voltage dropped across the resistive element. The signal applied to the switch acts as the "key". Other arrangements of components forming a keyed clamp can be used, the common aim being to remove the DC component of the voltage across the element such that the amplifier then amplifies only the AC part.

Both arrangements (sample and hold and DC restoration) offer the advantage over a simple differential amplifier that they will not be saturated by the high swings in current that occur during initial switch on of a phase and are simpler to implement than the differential amplifier which would need very high precision components to measure the small expected ripples in current. The output of the amplifier also only reflects the change in voltage during the measurement period rather than the absolute voltage across the measurement element.

The switch may comprise a transistor such as a field effect transistor, the control signal being applied to the base of the transistor to vary the impedance between its collector and emitter. It may comprise a mechanical switch such as a relay.

The output from the measuring circuit may further be amplified using an analogue amplifier. It may then be fed to an A/D converter where the magnitude of the signal is converted into digital form as a measured current value.

The digital measured current di/dt value may be stored in a memory such that a running temporal window of measurements is stored for subsequent analysis. The apparatus may therefore include an area of volatile memory in which samples can be stored prior to processing.

The current measuring circuit may be provided as an ASIC.

The apparatus may include a pulse generator circuit which generates a pulse waveform that is applied to the motor phase, the switch controller starting the measurement period after the leading edge of the pulse and ending it before the trailing edge of the pulse (or vice versa) by operating the switch. The pulse may be of a known nominally constant current value, i.e. it may be a square wave pulse. The pulse may comprise a normal pulse used within a motor PWM control scheme.

The switch controller may receive a signal from the test pulse generator, which may form part of a motor controller circuit.

The current measurement circuit may take measurements as soon as the measurement period starts. Otherwise, the switch may be moved from a closed position to an open position (or from an open position to a closed position) to define the start of a measurement period of time at a time of less than 10 useconds before the measurement circuit starts to take measurements, or less than 5 useconds or less than 1 usecond. This short delay allows a short measurement period to be used if desired. This is only possible because the switch, together with correct timing of the measurement period of time as will be described later, ensures the measurement circuit does not need time to "recover" from exposure to the edge of a pulse signal.

By providing an output we may mean that the output comprises an intermediary signal which is subsequently processed to provide a measure of motor position. The output may therefore not be readily accessible and may simply function as an input to a further electronic circuit. For instance, the circuit may be embodied as an ASIC and the output may comprise a process signal which is used as an input to a further circuit provided on the same ASIC.

According to a second aspect the invention provides a drive system for a multi-phase brushless electric motor comprising a plurality of phases, the system comprising a drive circuit including phase switching means for varying the phase voltage applied across each of the phases, and control means arranged to control the phase switching means so as to provide PWM control of the phase voltages to control the mechanical output of the motor, measure a rate of change of current in at least one of the phases during a test period and to determine therefrom the inductance of at least one of the phases thereby to determine the rotational position of the motor, the control means determining the change of current using the output of a current measuring circuit comprising:

a current measurement element having a resistance;

a switch which in use selectively permits transmission of a voltage dependent upon the voltage dropped across the current measurement element to a part of the circuit; and a switch controller which is adapted to operate the switch in response to timing signals supplied by the switch controller so as to define the measurement period of time.

The system may include a memory which stores inductance values relative to motor angular position.

The drive system may control the motor using a PWM scheme and as such may produce a PWM voltage pattern. The test period may be chosen to lie wholly within one pulse of the PWM pattern such that the voltage applied to the motor phases is known to be substantially constant throughout that period.

The means for varying may comprise a plurality of phase switches.

There will now be described, by way of example only one embodiment of the present invention with reference to and as illustrated in the accompanying drawings of which:

FIG. 2 is an illustration of the motor current measurement stage of the embodiment of FIG. 1;

FIG. 3 is an illustration of an alternative motor current measurement stage of the embodiment of FIG. 1.

Figure 1:
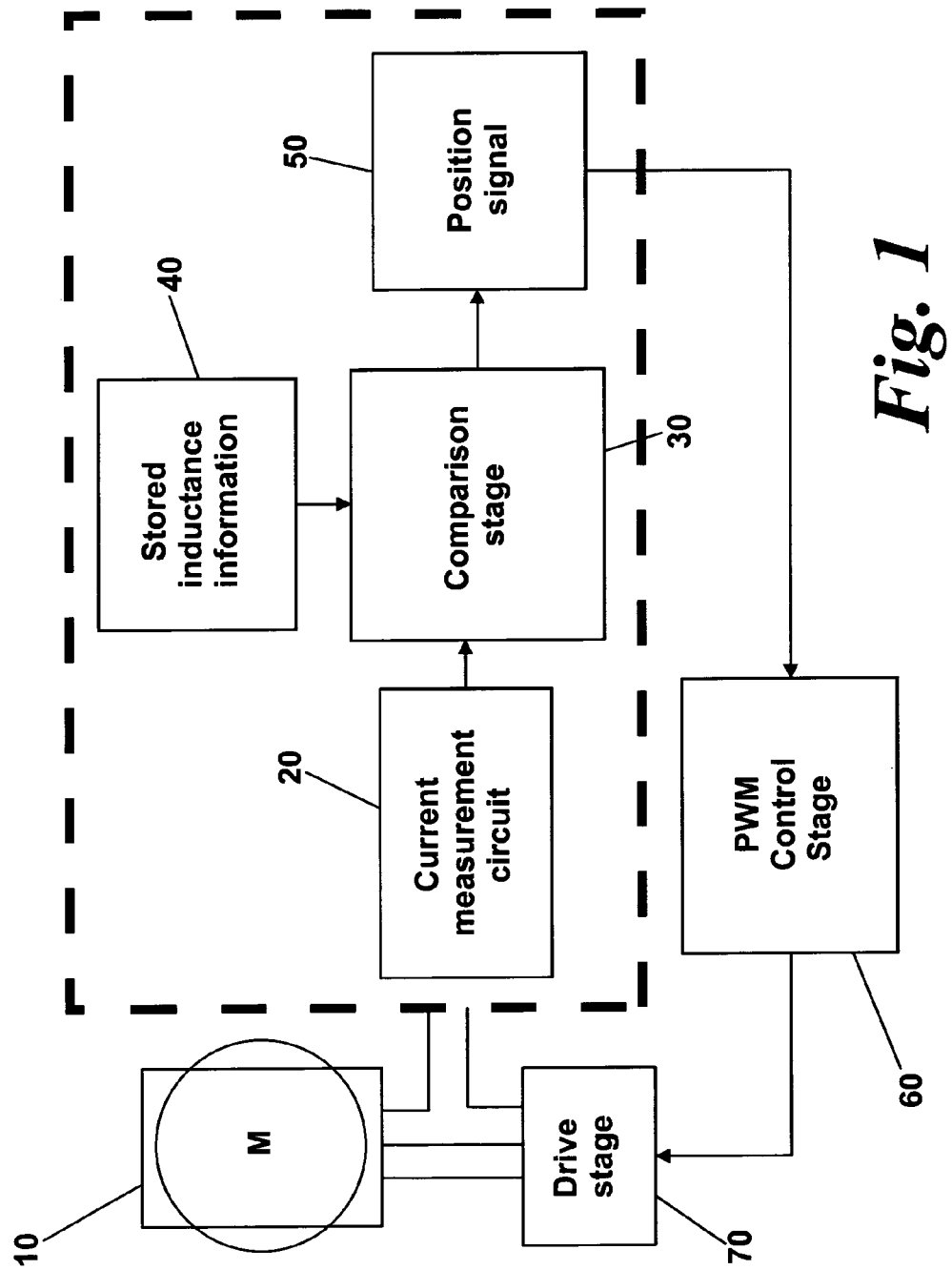
FIG. 1 is an illustration of an embodiment of a motor position measurement apparatus in accordance with one aspect of the present invention.

FIG. 1 shows an overview of an embodiment of a motor drive system in accordance with the second aspect of the invention. The system is shown connected to a motor, which in this example is a permanent magnet sinusoidal motor (also known as PMAC motor) having three phases. Such motors are well known in the art, and the skilled man will understand that they can be driven by applying square waveform voltages to each of the phases of the motor to approximate a sinusoidal waveform, the duty cycle of the square waveforms determining the motor speed. The PWM waveforms are generated by a PWM control stage 60 and implemented by a drive stage 70 comprising a plurality of phase switches.

Figure 5:
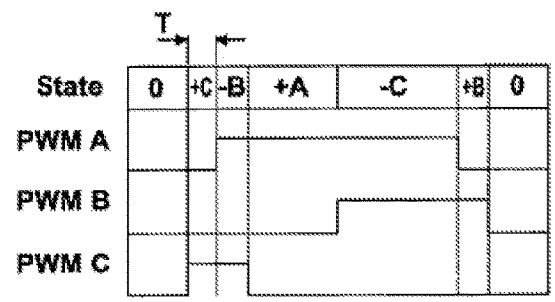
FIG. 5 shows a typical voltage waveform in a phase of the motor driven using a square wave PWM drive signal.
Figure 6:
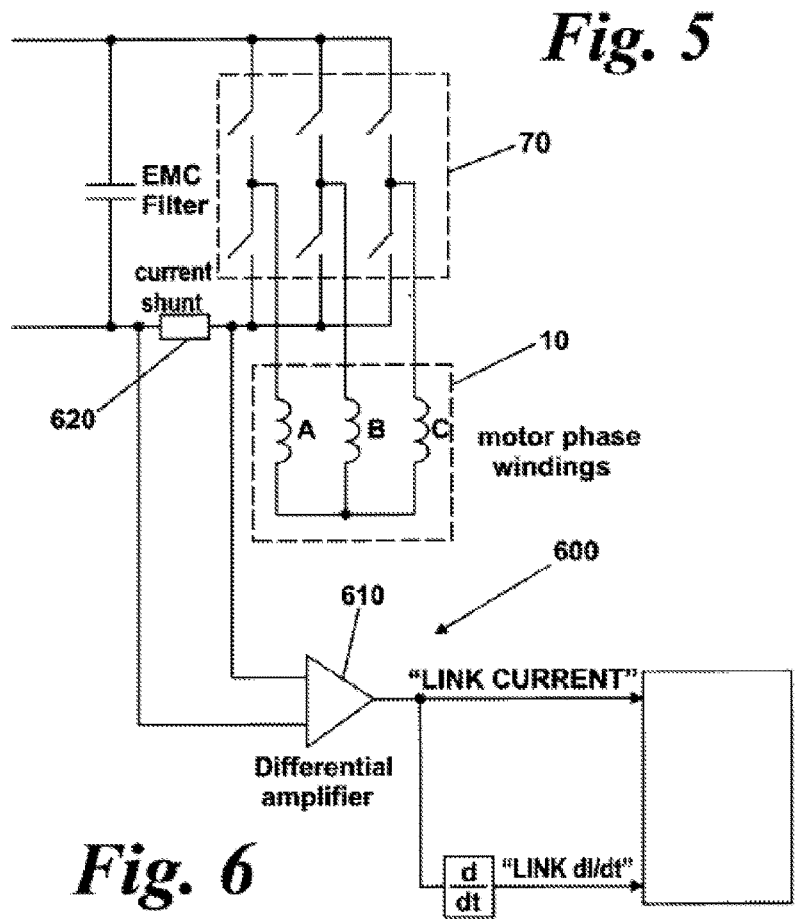
FIG. 6 illustrates a prior art current measuring circuit used in measuring the rate of change of current in a phase of a motor.

A typical set of waveforms to be applied to the 3 phases is shown in FIG. 5 of the drawings and in which a two test periods can be seen of equal length T. Note that at switch on of each phase the current rises rapidly in a phase, with a high corresponding di/dt and then settles down at a substantially constant DC level before it again falls rapidly. In reality small changes in the DC level will occur due to changes in phase inductance as the motor rotates.

Optionally, within the PWM pattern as shown in FIG. 5 a test pulse may be applied to the motor. The purpose of this test pulse is to provide a period of time in which a known current flows in only one phase of the motor (with no current applied to the others). This can then be measured, or more correctly the rate of change of that current can be measured, for use in determining the motor position. This test pulse should be kept as short as possible, say less than 10 useconds allowing many such short test pulses to be applied within a single motor revolution.

The system further comprises a motor current measurement circuit 20 and a comparison stage 30. The measurement circuit 20 determines the change of current in a motor phase over time during a test period (i.e. the ac component of the current), and the comparison stage 30 compares this with known motor inductance information 40 stored in memory. Since the change in current is caused by changes in inductance, knowledge of the former is used by the comparison stage to determine the corresponding changes in inductance and hence motor position 50. The more test pulses in a revolution, the more position measurements can be made allowing greater control.

A first embodiment of a motor current measurement circuit in accordance with a first aspect of the invention is shown in FIG. 2 of the accompanying drawings. The role of the circuit is to measure the change in instantaneous current during the time that current is applied to a phase of the motor during the test pulse period. As shown in FIG. 5, for example, several different periods in which the current flowing through the shunt resistor is equal to the current in phase A, B and C respectively are provided.

The measuring stage may comprise a shunt resistor 100 as shown through which the current applied to one of the phases is passed. The voltage V dropped across this resistor 100 then gives a measure of the current assuming that the value of the resistance is known, according to Ohms law.

The voltage V dropped across the resistor is fed to a keyed clamp circuit. In this example it comprises a capacitor C 200 which is connected on one side to the end of the resistor fed with the current from the phase winding and on its other side to an input of an operational amplifier 300. A switch in the form of a transistor 400, is then connected between that input of the amplifier and a ground plane. A control signal is applied to the base of the transistor from a switch controller (not shown).

The operation of the circuit is as follows. The switch is normally closed so that the transistor pulls the input of the amplifier to ground. This state is held prior to the start of a measurement period of time. The input of the amplifier is held to ground and so the amplifier will give a zero voltage output. At the start of the measurement period of time the switch is opened so that the transistor presents a high impedance path from the amplifier input to the ground. The output of the amplifier 300 will then comprise a voltage whose amplitude varies as a function of the change in voltage across the resistor since the measurement period started. This occurs because a voltage across the capacitor is clamped at the time that the switch is opened.

An alternative embodiment of a motor current measurement circuit in accordance with the present invention is shown in FIG. 3 of the accompanying drawings. This uses a sample and hold circuit to capture the current value just after the current flows in the phase, and then sends this to one input of an differential amplifier.

The circuit comprises a sample and hold amplifier which stores voltage across the resistor on a capacitor whilst a control switch is held open (the "sample" state of the amplifier). In this state the voltage presented at the output of the amplifier will be equal to the voltage dropped across the resistor. When the switch is closed (the "hold" state of the amplifier) the voltage is held on the capacitor and is presented at the output of the amplifier as the held value.

The output of the sample and hold amplifier is fed to the negative input of a differential amplifier. The other input of the amplifier receives the voltage across the resistor directly. The output of the amplifier prior to the measurement period will therefore be zero, since the voltage at both inputs will be the same and during the measurement period will be a function of the change in voltage across the resistor 100 since one input is held at a fixed level.

This alternative circuit is slightly less preferred as the operational amplifier would require a positive and negative supply voltage which makes it less suited to battery powered applications such as automotive applications.

In both cases, the output of the measurement circuit is an analogue signal whose voltage varies as the current in the phase varies, and which has the DC offset removed from it. This is an analogue signal and is converted to digital using an A/D converter. Because the measurements only start after current has started to flow, the large initial rise in di/dt is not included in the measurements. This could otherwise saturate the circuits which may then need some time to recover. Leaving it until this event has passed removes this problem.

Figure 4A:
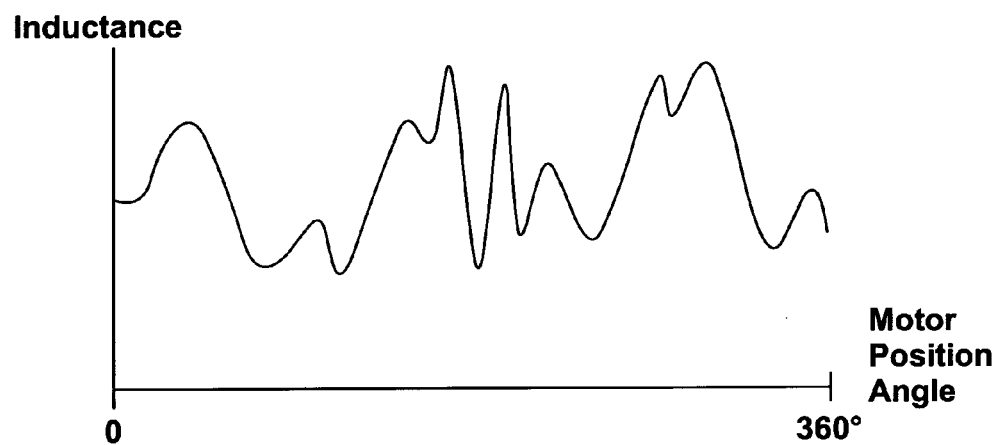
FIGS. 4(a) to (d) are graphs showing typical stored inductance values, current measurements and the manner in which they can be matched to the stored inductance values to determine both motor position and speed by the apparatus of FIG. 1.

The comparison stage performs the function of comparing the changes in the rate of change of current over time with the known changes in inductance of the motor as it rotates. To perform this comparison the stage requires access to inductance values as a function of position. A table of such values are therefore stored in a memory which can be accessed by the comparison stage. A set of values for a complete motor revolution is shown in FIG. 4(a).

Figure 4B:
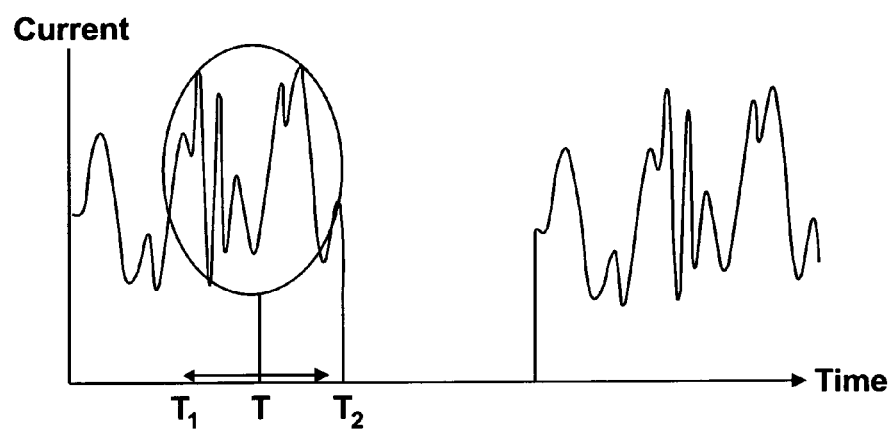

A set of current rate of change measurements are shown in FIG. 4(b) for a time period which corresponds to 2 rotations of the motor. Of course, if the motor were to be slowed down, this time period would correspond to less rotations, and the opposite if it were sped up. At this stage the motor speed is not known, nor is its position at any time.

A window is then applied to the current samples having a centre time T and spanning from a time T1 to T2. This window will comprise a predetermined number of samples. This window of samples is then compared with the set of inductance values to find a best match. The aim is to find the inductance value that best corresponds to the central sample at time T.

Figure 4C:
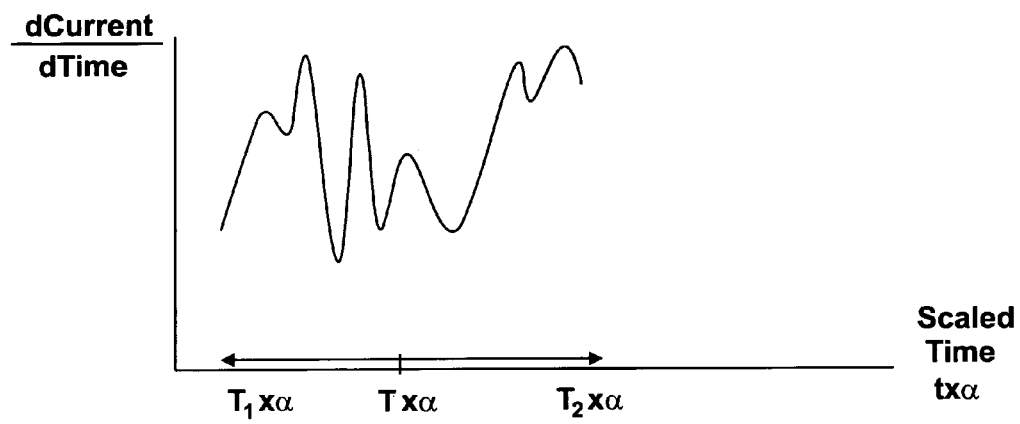
Figure 4D:
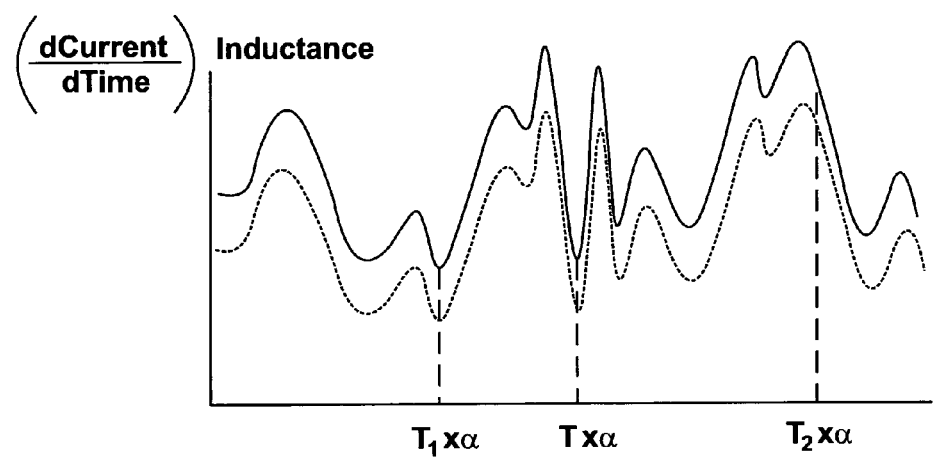

This match can be seen conceptually in FIGS. 4(c) and (d) of the accompanying drawings. In making the match, the comparison stage needs to take into consideration that the speed of the motor as well as the position are unknown. The current samples may therefore need to be "speeded up" or "slowed down" to match the stored inductance samples. This is shown in FIG. 4(c) where in the example they are slowed down by a factor α so that it matches a portion of the inductance sample shown in 4(d).

The amount of stretch, i.e. the value of α can be determined by seeing how many samples have been captured before the pattern repeats, and interpolating to make the same number of samples fit this period as there are stored inductance samples for one revolution.

The amount of stretch or compression gives a measure of the motor speed. The position on the rotor that corresponds to the inductance value that matches the sample at time T indicates the rotor position at that time. In the example this is about 180 degrees.

Having matched the current samples to the inductance samples the speed of the motor has therefore been determined as well as the motor position.

In a refinement, a number of sets of samples obtained from different motor drive pulses can be combined to smooth out the measurements. This can be used to reduce the effects of noise and increase the accuracy of the measurements. Also, the process can be repeated for more than one phase.

The invention claimed is:

1. A current measuring circuit adapted to provide an output indicative of the change in the current flowing in at least one phase of an electric motor over a measurement period of time, the current measurement circuit including:
    a current measurement element having a resistance in series with at least one phase of the motor;
    a switch which, in use, selectively permits and prevents transmission of a voltage that is indicative of the instantaneous value of the voltage dropped across the current measurement element to a part of the current measurement circuit that measures the change in the voltage dropped across the current measurement element during the measurement period of time; and
    a switch controller which is adapted to operate the switch in response to timing signals supplied by the switch controller so as to define the measurement period of time,
    in which the current measurement circuit is adapted to provide an output indicative of the change in the current flowing in the at least one phase during the measurement period of time, wherein the measurement period of time either starts after the leading edge of a pulse and ends before the next trailing edge of the pulse or starts after a trailing edge of the pulse and before the next leading edge of a pulse, the voltage applied to the phase being constant during the measurement period of time, and to determine therefrom the inductance of at least one of the phases thereby to determine the rotational position of the motor from a known variation of inductance with motor position.

2. A current measuring circuit according to claim 1 in which the switch is operable between a first state in which it is open and a second state in which it is closed.

3. A current measuring circuit according to claim 1 in which the current measuring element comprises one or more resistors connected in series with a phase of the motor such that current flowing through the motor phase flows through the resistor, the measuring circuit being arranged to measure the change in the voltage dropped across the resistor during the measurement period of time.

4. A current measuring circuit according to claim 3 which further includes a capacitor which prior to the measurement period of time is electrically connected to the resistor when the switch is in the first state such that the voltage across the capacitor is dependent on the voltage across the resistor, and which during the measurement period of time the capacitor is electrically isolated from the resistor so as to hold across its terminals a voltage equal to the voltage across the resistor at the time that the switch is moved to it second state.

5. A current measuring circuit according to claim 4 in which in the first state the switch is open and in the second state it is closed.

6. A current measuring circuit according to claim 4 in which the capacitor and switch form part of a sample and hold circuit with the switch performing the function of the trigger for the sample and hold circuit.

7. A current measuring circuit according to claim 6 in which the sample and hold circuit comprises a differential amplifier having a first input connected to the current measuring element and a second input connected to the side of the capacitor that is not connected to the switch.

8. A current measuring circuit according to claim 1 which includes a capacitor which prior to the measurement period of time is electrically connected at one end to the resistive element both immediately prior to the measuring period and during the measuring period and in which the switch is adapted to connect the other end of the capacitor to ground immediately prior to the measuring period of time and to isolate the said other end of the capacitor from ground during the measurement period of time.

9. A current measuring circuit according to claim 8 in which the said other end of the capacitor is electrically connected to the input of an amplifier to form a keyed clamp or DC restoration amplifier circuit with respect to the DC component of the voltage dropped across the resistive element.

10. A current measuring circuit according to claim 1 in which the switch comprises a field effect transistor, the control signal being applied to the base of the transistor to vary the impedance between its collector and emitter.

11. A current measuring circuit according to claim 1 in which the output from the measuring circuit is further amplified using an analogue amplifier and then fed to an A/D converter where the magnitude of the signal is converted into digital form as a measured current value.

12. A drive system for a multi-phase brushless electric motor comprising a plurality of phases, the system comprising:
   a drive circuit including phase switching means for varying the phase voltage applied across each of the plurality of phases, and
   control means arranged to control the phase switching means so as to provide PWM control of the phase voltages to control the mechanical output of the multi-phase brushless electric motor, measure a rate of change of current in at least one of the plurality of phases during a test period and to determine therefrom the inductance of at least one of the plurality of phases thereby to determine the rotational position of the multi-phase brushless electric motor,
   the control means determining the change of current using the output of a current measurement circuit comprising:
   a current measurement element in series with at least one phase of the motor;
   a switch which, in use, selectively permits and prevents transmission of a voltage that is indicative of the voltage dropped across the current measurement element to a part of the current measurement circuit that measures the change in the voltage dropped across the current measurement element during the measurement period of time; and
   a switch controller which is adapted to operate the switch in response to timing signals supplied by the switch controller so as to define the measurement period of time
   in which the current measurement circuit is adapted to provide an output indicative of the change in the current flowing in the at least one phase during the measurement period of time, wherein the measurement period of time either starts after the leading edge of a pulse and ends before the next trailing edge of the pulse or starts after a trailing edge of the pulse and before the next leading edge of a pulse, the voltage applied to the phase being constant during the measurement period of time, and to determine therefrom the inductance of at least one of the phases thereby to determine the rotational position of the motor from a known variation of inductance with motor position.

13. The system of claim 12 which includes a memory which stores inductance values relative to motor angular position.

14. A current measuring circuit according to claim 1 in which the switch ensures that at least parts of the measuring circuit is not exposed to the voltage request the current measurement element at a time when excessively high rates of change of current occur in the phase.

15. A current measuring circuit according to claim 12 in which the switch ensures that at least parts of the measuring circuit is not exposed to the voltage request the current measurement element at a time when excessively high rates of change of current occur in the phase.

* * * * *